3,586,653
PROCESS OF MANUFACTURING ALKYD RESINS FROM UNSATURATED FATTY ACIDS, PHTHALIC ANHYDRIDES AND GLYCIDOL
Jacques Fritz, Champagne-au-Mont-d'Or, France, assignor to Progil, Paris, France
No Drawing. Filed Jan. 7, 1969, Ser. No. 789,598
Claims priority, application France, Jan. 12, 1968, 49,516
Int. Cl. C08g *17/007, 17/16;* C09d *3/64*
U.S. Cl. 260—22EP                                       7 Claims

ABSTRACT OF THE DISCLOSURE

Modified alkyd resins are made by contacting a mixture of unsaturated fatty acids, phthalic anhydride and glycidol, heating progressively to a temperature of 200–250° C. until the theoretical quantity of water is formed and then removing the unreacted raw materials by distillation. The reaction can be conducted in the presence of an organic solvent.

The present invention relates to a novel process of manufacturing alkyd resins. It relates more especially to the manufacture of modified and improved alkyd resins, from an epoxy-alcohol, fatty acids and phthalic anhydride, and to the novel resulting products.

Numerous processes of alkyd resin modification have already been described. Indeed, it is known that glyptal resins obtained by glycerol and phthalic anhydride condensation are brittle and have little flexibility. A greater flexibility is imparted to them by replacing a part of the phthalic anhydride by a mixture of glycerides containing fatty acids.

According to one of these techniques, glyceral is introduced into a hot saponifiable oil and after monoglyceride is obtained by alcoholysis, phthalic anhydride is added to obtain the modified alkyd resin (German Pat. No. 1,184,956 dated Sept. 14, 1954). According to a variant of these techniques, oil is introduced into the hot polyol.

According to another process, glycerol, phthalic anhydried and linseed oil are introduced simultaneously and the mixture is melted (U.S. Pat. No. 1,888,849). According to a variant of these techniques linseed oil is replaced by linseed oil fatty acids (U.S. Pat. 1,893,611).

These processes lead to alkyd resins which seldom have all of the required qualities for their utilization in the form of coatings and paints; that is, not too high a viscosity and a low coloration for mass-resin and excellent mechanical characteristics, such as a convenient flexibility for a high hardness of foils and coatings made from such resins.

It has now been found that modified alkyd resins may be obtained, which do not have the precited disadvantages and are able to give rise especially to varnishes having a great superficial hardness, when, under certain conditions, an epoxy-alcohol, such as glycidol or 2,3-epoxy-1-propanol, is substituted for glycerol.

The obtaining of good results by using this new raw material is the more surprising in that it is usually recommended to remove any glycidol traces in the glycerol used for alkyd resin synthesis (see for example the German Pat. No. 1,184,956 dated Sept. 14, 1954).

Further, it should be noted that the common general techniques used for alkyd resin fabrication from glycerol, such as by alcoholysis and triglyceride oil melting, are not suitable when an epoxy-alcohol is substituted for this classical triol.

Accordingly, it is an object of the present invention to develop a novel process especially convenient for the manufacture of alkyd resins from glycidol and other classical reagents, the operative conditions of which are not the ones conventionally recommended when using glycerol.

Another object of the present invention is the manufacture of mass-resins which are usable as the major constituent of paints and coatings, the properties of which are more advantageous than the ones of known compositions based on glycerol and the cost of which is lower. It is apparent that glycidol is becoming a more and more available raw material due to allyl alcohol epoxidation techniques and now constitutes an economical means for obtaining glycerol itself.

According to the process of the present invention, unsaturated fatty acids, phthalic anhydride and glycidol are simultaneously brought into contact at room temperature, then, with continuous stirring, the reaction mixture is progressively heated up to a temperature reaching 200 to 250° C. until all of the formed water is recovered, after which the possible traces of unreacted raw materials are removed by distillation.

The alkyd resin obtained in this way may be recovered and stored as a mass-resin. It is also possible to dissolve it in a convenient solvent to obtain, after addition of a convenient catalytic system, and possibly of anti-skinning agents, pigments and thixotropic agents, coatings and paints of glycerophthalic type capable of forming films having an excellent hardness and a great abrasion and shock resistance.

By use of the words "unsaturated fatty acids" are meant compositions containing more than 30% by weight of fatty acids which contain at least two ethylenic double bonds in their molecule, such as for example linoleic and/or linolenic acid. Such acids or acid mixtures may be extracted from well-known oils such as soya, linseed, cotton seed, etc.

Glycidol which may be obtained according to the known processes of allkyl alcohol epoxidation—such as the one described in applicant's French Pat. 1,548,678 dated Oct. 12, 1967—does not require any special criterion of purity. It is the same for phthalic anhydride, the quality of which is standard quality for alkyd resin manufacture.

According to a preferred form of the process according to the invention, an excess of glycidol is used with respect to the quantity of phthalic anhydride. This excess is generally between 15 and 35% of the quantity theoretically necessary to esterify the carboxylic groups present. It is advantageously between 20 and 30%.

The fatty acid quantities used may vary between large limits according to the type of resins to be obtained but they represent generally 30 to 65% of the weight of the final mass-resin.

According to a variant of the process of the invention, a technique of azeotropic fusion may be substituted for the simple fusion method described hereinabove. In this especially advantageous application form, an organic solvent is added to the mixture of unsaturated fatty acids, phthalic anhydride and glycidol, then the reaction mass is heated up to 200–220° C., the solvent being later removed by distillation at the same time as unreacted raw material traces.

There may be used as a solvent any organic liquid which is inert with respect to the raw materials; which has a boiling point higher than 100° C; and which is able to form an azeotrope with the water formed during condensation. It is especially advantageous to use hydrocarbons such as cycloaliphatic and aromatic hydrocarbons among which it is possible to mention, in an illustrative way, toluene, xylenes, biphenyl, etc.

Practically, according to this variant, glycidol, fatty acid and phthalic anhydride are loaded into the condensation reactor, maintained preferably under an inert atmosphere such as nitrogen, at room temperature, then the mixture is heated up to a temperature of between 110 and 130° C. Because of the exothermicity, the reaction mass reaches a temperature of the range of 170–190° C. without further heating at which point the condensation water begins to appear. Then it is heated again progressively to reach a temperature of between 200 and 220° C., which is maintained until the recovery of all of the water. This condensation phase is generally achieved under atmospheric pressure.

The reaction mass is freed from its organic solvent by distillation, and then any traces of unreacted raw materials present are removed, by a final distillttion under vacuum, for example under 2 to 50 mm. Hg. The novel alkyd resins obtained according to the process of the invention have, as indicated hereinabove, advantageous properties which make them especially fit for use in the field of glycerophthalic paints and varnishes. The hypothesis may be formulated that the superiority of these resins with regard to glycerol alkyd resins and especially the excellent flexibility of the resin and the hardness of the varnish films are due to the presence in the resin of glycidol homopolymer, which plays the part of a plasticizer and which may be cross-linked in the presence of known curing catalysts. The following examples quoted in a non-limitative way, show how the invention may be applied.

EXAMPLE 1

Into a reactor provided with a stirrer, a thermometer, a cooler connected to a water collecting vessel, a manometer and an inert gas inlet, there is introduced at one time:

| | Parts (by weight) |
|---|---|
| Phthalic anhydride | 740 |
| Linseed oil fatty acids in which acids having two ethylenic bonds or more represent more than 75% of the total weight of acids | 1460 |
| Glycidol | 465 |
| Xylene | 420 |

On the other hand, the water collector is filled with xylene. The glycidol excess with regard to theoretical required is 25%.

The reactor contents are stirred and during all the operation a dry nitrogen stream is maintained.

Heating is started and after 10 minutes, the temperature reaches 120° C. The reaction medium becomes limpid and then heating is stopped, as the exothermal reaction is enough to bring the temperature to 180° C. in 10 minutes.

Then the reaction water begins to gather in the collector. Heating is started again and the temperature is maintained at 120° C. The temperature is progressively increased up to 190° C. after 1 hour and 30 minutes; to 200° C. after 2 hours and 30 minutes and to 210° C. after 6 hours and 30 minutes of operation. This temperature is maintained until the reaction is completed. After 8 hours the quantity of water recovered is 89 parts (theory 90) and does not change until the end.

After 10 hours, xylene is removed and after 13 hours a vacuum of 20 mm. Hg is established in order to remove the last traces of xylene and any of the unreacted glycidol and phthalic anhydride. The heating is stopped, vacuum is broken down and the resin is hot cast (at about 150° C.) either in a vessel if it is desired to keep the resin as a mass or in a convenient solvent if it is desired to obtain a solution for coating formulations.

Following are the mass resin characteristics, obtained in this way:

| | |
|---|---|
| Content in fatty acids (percent) | 56 |
| Gardner coloration | 9 |
| Density at 50° C. | 1.070 |
| Viscosity at 50° C. (poises) | 110 |
| Refraction index at 50° C. | 1.5050 |
| Acid value | 6.2 |
| Hydroxyl value | 36.0 |

EXAMPLE 2

From the mass resin obtained according to Example 1, a coating of the following composition has been formulated:

| | Parts (by weight) |
|---|---|
| Mass alkyd resin | 500 |
| White-spirit | 500 |
| Cobalt naphthenate (with 6% of metal) | 5 |
| Lead naphthenate (with 24% of metal) | 13 |
| Manganese naphthenate (6% of metal) | 2.5 |

This coating, applied in a thickness of 40 microns on a degreased sheet has been subjected to the following series of tests:

(a) Drying times

There were determined the time necessary to produce a film so that dust does not adhere thereto and also the time necessary in order that the film remains undamaged when touched.

(b) Pendular hardness

This has been measured with the help of a Persoz pendulum according to the French standard T–30,016 of May 1965 ("Pendulum hardness tests of protective paint and varnish films").

The results obtained are summarized in the table hereinafter:

| | Time |
|---|---|
| Dry to dust | hours 2 |
| Dry to touch | do 8 |
| Pendular hardness determined after 65 hours of drying: | |
| At 20° C. | seconds 70 |
| At 50° C. | do 125 |
| At 100° C. | do 255 |

As a comparison, coating formulations were made using compositions identical to the one described hereinabove, except that the mass alkyd resin was synthesized under the same conditions as in Example 1, but by replacing the 465 parts of glycidol by 460 parts of glycerol.

In conducting the precited tests, it was noted on the one hand that drying times were at least 50% higher, and on the other hand that the pendular hardness was at least 30% lower than the figures obtained with the coatings according to the present invention.

What is claimed is:

1. A process of manufacturing modified alkyd resins, comprising contacting simultaneously, at room temperature a mixture consisting essentially of at least one unsaturated fatty acid, having at least two ethylenic double bonds, phthalic anhydride and glycidol, heating the reaction mass progressively with constant stirring, to a temperature of between 200 and 250° C. until complete recovery of the theoretical quantity of formed water and then removing the untreated raw material traces by distillation, the relative amounts of the reactants being such that the final alkyd resin mass contains 30–65% by weight of unsaturated fatty acid.

2. A process according to claim 1 wherein an excess of glycidol is used of between 20–30% with respect to the quantity theoretically necessary to esterify the carboxylic groups.

3. A process of manufacturing modified alkyd resins according to claim 1 wherein the reaction occurs in the presence of an organic solvent, the heating is to a temperature of 200–220° C. and the solvent is also removed by distillation.

4. A process according to claim 3 wherein the organic solvent used is a liquid, inert with regard to reagents, boiling at a temperature greater than 100° C. and selected from the group consisting of aromatic and cycloaliphatic hydrocarbons.

5. A process according to claim 3 wherein the reagents contacted at room temperature are heated up to a temperature of between 110 and 130° C., the reaction developing exothermically without heating until the condensation water appears at a temperature in the range of 170–190° C., after which the temperature is increased up to 200–220° C. until total recovery of the theoretical quantity of water, the solvent and the possible traces of unreacted raw materials being then removed by distillation.

6. A process according to claim 4 wherein the reagents contacted at room temperature are heated up to a temperature of between 110 and 130° C., the reaction developing exothermically without heating until the condensation water appears at a temperature in the range of 170–190° C., after which the temperature is increased up to 200–220° C. until total recovery of the theoretical quantity of water, the solvent and the possible traces of unreacted raw materials being removed by distillation.

7. As new compositions of matter, the modified alkyd resins obtained according to the process of claim 1.

References Cited

UNITED STATES PATENTS

| | | | |
|---|---|---|---|
| 2,653,141 | 9/1953 | Greenlee | 260—18 |
| 2,966,479 | 12/1960 | Fischer | 260—78.4 |
| 1,888,849 | 11/1932 | Dawson | 260—22 |
| 1,893,611 | 1/1933 | Bradley | 260—22 |
| 2,720,500 | 10/1955 | Cody | 260—47 |
| 3,374,208 | 3/1968 | Seiner et al. | 260—78.4 |
| 3,404,018 | 10/1968 | Hicks | 106—252 |

FOREIGN PATENTS

| | | | |
|---|---|---|---|
| 946,433 | 1/1964 | Great Britain | 260—75 |
| 1,548,678 | 12/1968 | France | 260—635 |
| 1,184,956 | 9/1965 | Germany | 260—22 |

DONALD E. CZAJA, Primary Examiner

R. W. GRIFFIN, Assistant Examiner

U.S. Cl. X.R.

117—161K; 260—33.6R; 40R